June 5, 1934.  W. J. CRITES ET AL  1,961,280
METHOD AND APPARATUS FOR CONTROLLING OIL WELLS
Filed July 11, 1933  2 Sheets-Sheet 1
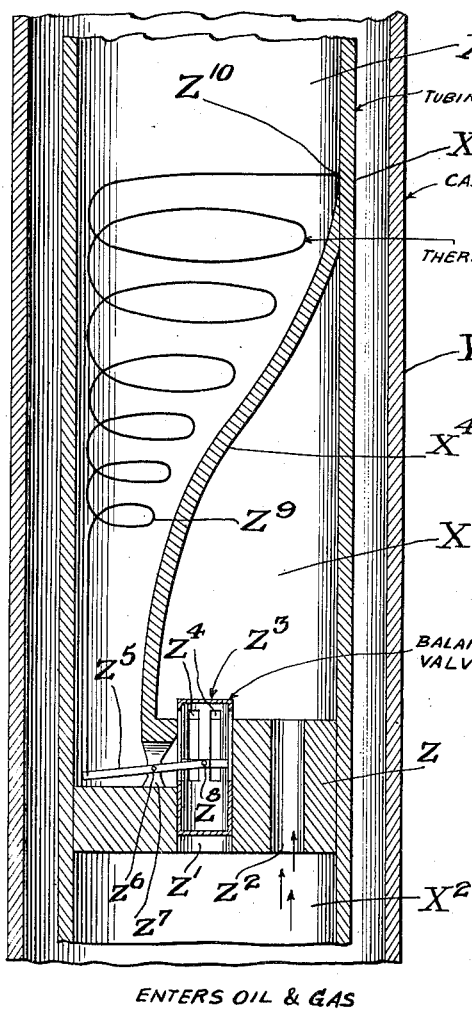
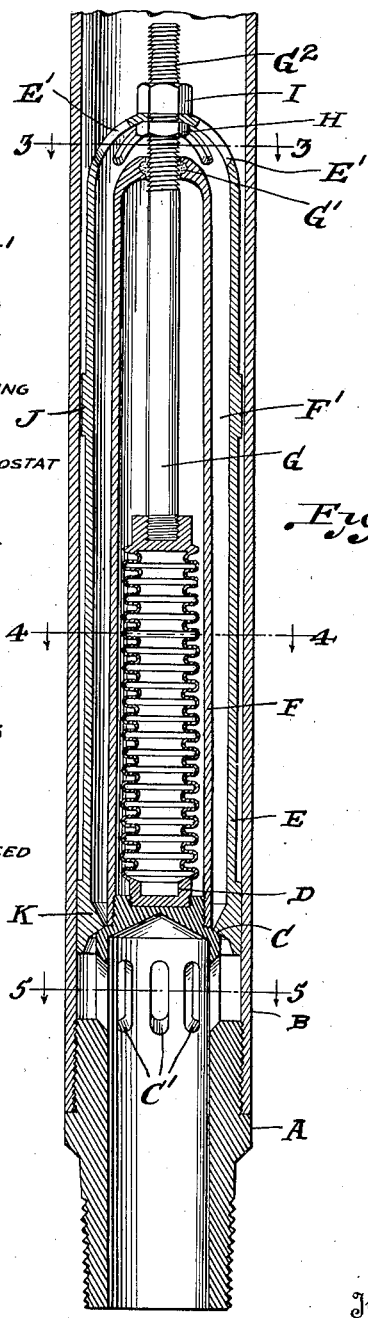
Inventors
Wilbur J. Crites
AND Donald R. Knowlton
By Robt. E. Barry
Attorney June 5, 1934.  W. J. CRITES ET AL  1,961,280
METHOD AND APPARATUS FOR CONTROLLING OIL WELLS
Filed July 11, 1933   2 Sheets-Sheet 2
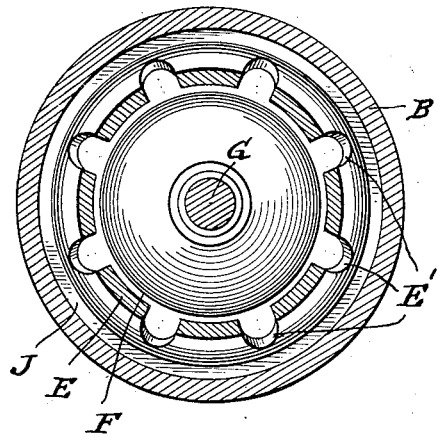
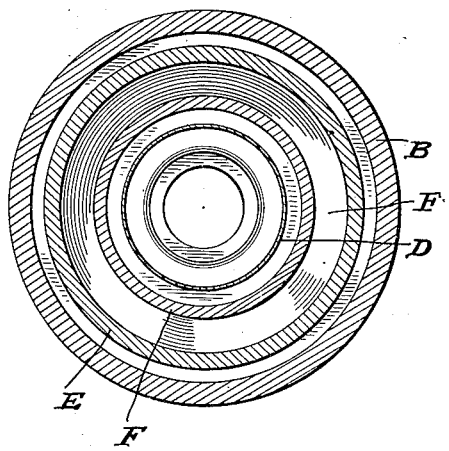
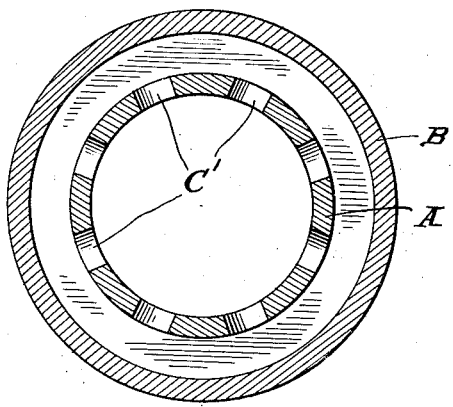
Inventors
Wilbur J. Crites
AND Donald R. Knowlton
By Robt. E. Barry
Attorney Patented June 5, 1934

1,961,280

UNITED STATES PATENT OFFICE 1,961,280

METHOD AND APPARATUS FOR CONTROLLING OIL WELLS

Wilbur J. Crites and Donald R. Knowlton, Bartlesville, Okla., assignors to Phillips Petroleum Company, Bartlesville, Okla., a corporation of Delaware Application July 11, 1933, Serial No. 679,952

14 Claims. (Cl. 166—21)

This invention relates to improvements in devices for automatically adjusting at the bottom of an oil well, or at some point below the ground surface, the flow of oil and gas, so that the well may be produced at a rate and/or in such a manner that the least amount of gas will be produced, or at a rate and/ or in a manner that less gas will be produced than would be the case without this device. The device may be used to control the production of oil and/or gas coming from the producing formation, or it may be used to control the oil or the oil and gas coming from the producing formation activated by gas injected extraneously.

The primary object of the invention is to furnish the oil industry with a valve, rugged in construction and positive and automatic in operation and adjustments, whereby the production of oil and gas may be so controlled that a greater amount of gas energy may be conserved in the producing formation than under customary producing methods, and possibly a greater amount than by any other method. The device may be applied to wells flowing under their own energy, to wells flowed by the introduction of extraneous gas, to wells in which the fluid is lifted by mechanical means, or to any combination of such lifting forces.

A further object is to provide a device for the above mentioned purposes, the adjustment and operation of which is effected by thermal control means, for example, through the difference in the expansion of various metals and liquids under changing temperatures, and upon the characteristic of gas to expand with a resultant decrease in temperature when passed through restricted apertures, or when acted upon by other influences which cause a reduction in pressure.

In the production of any oil well, as the ratio of gas to oil increases, the temperature decreases; and conversely, as the ratio of gas to oil decreases, the temperature increases. Consequently, a device acting in response to temperature changes, we have discovered, may be used to control the flow so that the flow will be increased under increasing temperatures in the well, whereby the oil will be produced with less gas than if allowed to flow unrestricted or by a regulation that is unaffected by a gas-oil ratio influence.

It will therefore be understood that another object of our invention is to supply means for producing oil at low gas-oil ratios through the use of thermostatically operated devices responsive to changing temperatures coincident to changing gas-oil ratios.

With the foregoing objects outlined and with other objects in view which will appear as the description proceeds, the invention consists in the novel features hereinafter described in detail, illustrated in the accompanying drawings, and more particularly pointed out in the appended claims.

In the drawings,

Fig. 1 is a vertical sectional view more or less diagrammatically illustrating the application of the device to an oil well of the type having a casing and tubing.

Fig. 2 is a vertical sectional view of a preferred embodiment of the same.

Figs. 3, 4 and 5 are enlarged transverse sectional views taken respectively on the lines 3—3, 4—4 and 5—5 of Fig. 2.

Referring first to the simplified form of the invention illustrated in Fig. 1, X indicates an oil well tubing, and Y the well casing. A partition Z may be arranged transversely across the tubing to divide the same into an upper portion $X'$ and a lower portion $X^2$. The partition is imperforate, with the exception of two ports $Z'$ and $Z^2$, the latter serving for the restricted passage of well fluid from below the partition into a chamber $X^3$ which is positioned above the partition and segregated from the upper portion $X'$ of the tubing by an imperforate dividing wall $X^4$.

A hollow piston type balanced valve $Z^3$ is guided by the port $Z'$, and its upper and lower ends are closed, but its cylindrical wall is provided with slots $Z^4$.

A lever $Z^5$ has its medial portion pivotally mounted at $Z^6$ within a port $Z^7$ which places the port $Z'$ in communication with the upper portion $X'$ of the tubing.

The valve is pivotally connected to one end of the lever at $Z^8$, and the other end of the lever is secured to one end of a thermostat $Z^9$ which has its other end fixed to the tubing at the point $Z^{10}$.

In this simple form of the invention, it will be readily understood that temperature conditions within the tubing immediately above the partition will cause either expansion or contraction of the thermostat, and the latter in turn, through the medium of the lever, will control the valve $Z^3$, so that more or less well fluid will flow through $Z^2$, $X^3$, $Z^4$, and $Z^7$, past the thermostat. Consequently, as the ratio of gas to oil increases, and the temperature decreases, the thermostat will contract and the valve will be moved downwardly to reduce or even stop the flow. On the other hand, as the ratio of gas to oil decreases, the temperature will be raised, and the thermostat will expand to lift the valve and increase the flow.

In the commercial application of the invention illustrated in Figs. 2 to 5 inclusive, A is a hollow plug adapted to be inserted in a tubing string, and having external threads for use in attaching the plug to the lower end of a tubing section B.

The upper end of the plug is closed, and the upper end portion of the same has an annular valve seat C positioned immediately above slots C' which allow the well fluid to flow through the plug.

A thermostat D of the bellows type, which may be filled with any suitable expansion fluid, if desired, is arranged within a housing F which may be in the form of a tube having its lower end in threaded connection with the upper end of the plug.

A rod G is secured to the upper end of the thermostat, and it extends through a packing gasket G' arranged at the upper end of the housing. The housing is imperforate to prevent well fluid from entering the same, and its upper end acts as a guide for the rod.

An active valve member or valve head E is adjustably secured to the upper end of the rod G by any suitable means. For example, the upper end of the rod may be threaded as shown at $G^2$, and nuts H and I engaging the threaded portion of the rod, may be employed to adjustably clamp the upper end of the member E to the rod. The member E is preferably of tubular form, and is dome-shaped at its upper end, and provided with slots E'. The lower end portion of the valve head has an annular internal shoulder K which cooperates with the seat C to control the flow of well fluid from the slots C' into the annular passageway F' between the members E and F.

For the purpose of guiding the valve head E, its lower end portion snugly and slidably engages the inner surface of the tubing section B, and an annular external flange J' on the upper portion of the member E slidably engages the internal surface of the tubing section.

It is believed that the operation of the embodiment of the invention illustrated in Figs. 2 to 5 inclusive will be obvious from the above description to those skilled in the art, but in order that the operation may be clear to anyone reading the disclosure, the following statement may be made.

Bottom hole temperatures are maximum under a non-flowing condition. Therefore, before installing this device, bottom hole temperatures will be obtained, and the valve will be so adjusted before the device is inserted in the well that the position of the valve when installed at the desired position in the well will be at its maximum opening.

As the flow is started by opening a control valve, not shown, at the surface, the temperatures adjacent to the device will slightly decrease, and the valve will close slightly, but not sufficiently to affect the flow appreciably, as long as the gas-oil ratio is constant. But, should the gas-oil ratio increase, the valve will close further, due to the effect of temperature caused by expanding gas. Should the gas-oil ratio continue to increase, the valve will close still further, even to entirely stopping the flow, and the valve will not open until it is covered with oil, or if it does, the temperature caused by the gas passing through the restricted opening between C and K will immediately close it. Thus, the valve cannot be effectively opened until oil is present to pass through it. It is apparent that the valve will soon adjust itself to maintain a flow at the lowest possible gas-oil ratio.

Should the tubing be too large to support a flow at this rate, the well will flow by heads, or if much too large, will bleed off the gas in small quantities by heads.

Should the tubing be too small to accommodate the maximum flow at the best gas-oil ratio, the well will still produce at a low gas-oil ratio, if not its best, the flow being controlled partially by the device and partially by the tubing size. By means of the device, the proper size tubing for any well may be determined by those familiar with well equipment.

From the foregoing it is believed that the construction, operation and advantages of our invention may be readily understood by those skilled in the art, and it is apparent that changes may be made in the details disclosed, without departing from the spirit of the invention, as expressed in the claims.

What is claimed and desired to be secured by Letters Patent is:

1. A method of controlling the flow of oil from a well, comprising passing oil and gas upwardly through a well passageway, restricting the flow of the oil and gas through said passageway at a point within the well, and utilizing temperature changes within the passageway adjacent to said point of restriction for decreasing the flow of the oil and gas when the temperature decreases, and for increasing the flow of oil and gas when the temperature increases.

2. Well flow controlling means comprising a passageway for flowing oil and gas from the wall, a valve for controlling the flow of oil through said passageway, and thermostatic means responsive to temperature conditions within the passageway adjacent to said valve for closing the valve as the temperature decreases, and opening the valve as the temperature increases.

3. In a well, tubing, a valve in the tubing for controlling the flow of oil and gas up the tubing, thermally affected means in the tubing, and means controlled by said thermally affected means for closing the valve as the temperature decreases, and opening the valve as the temperature increases.

4. In a well, tubing, a valve in the tubing for controlling the flow of oil and gas up the tubing, thermally affected means in the tubing, and means controlled by said thermally affected means for closing the valve as the temperature decreases, and opening the valve as the temperature increases, said thermally affected means being positioned in close proximity to said valve.

5. In a well, tubing, a valve in the tubing for controlling the flow of oil and gas up the tubing, thermally affected means in the tubing, and means controlled by said thermally affected means for closing the valve as the temperature decreases, and opening the valve as the temperature increases, said thermally affected means being positioned in close proximity to the valve and immediately above the latter.

6. Well controlling means comprising a tubing section, a hollow plug forming a partition across the tubing section, said plug having an outlet port, a valve seat on the plug above said port, a valve head mounted for vertical movement in the tubing section and cooperating with said seat for controlling the flow of well fluid through said port and up the tubing section, thermally affected means in the tubing section, and means operatively connecting the thermally affected means to the said valve head for controlling the valve head by said thermally affected means.

7. Well controlling means comprising a tubing section, a hollow plug forming a partition across the tubing section, said plug having an outlet port, a valve seat on the plug above said port, a valve head mounted for vertical movement in the tubing section and cooperating with said seat for controlling the flow of well fluid through said port and up the tubing section, thermally affected means in the tubing section, and means operatively connecting the thermally affected means to the said valve head for controlling the valve head by said thermally affected means, the means connecting the thermally affected means in the valve head including elements for adjusting the valve head relatively to said seat.

8. Well controlling means comprising a tubing section, a hollow plug forming a partition across the tubing section, said plug having an outlet port, a valve seat on the plug above said port, a valve head mounted for vertical movement in the tubing section and cooperating with said seat for controlling the flow of well fluid through said port and up the tubing section, thermally affected means in the tubing section, and means operatively connecting the thermally affected means to the said valve head for controlling the valve head by said thermally affected means, said valve head being of tubular form and being guided by the tubing section and surrounding the thermally affected means.

9. Well controlling means comprising a tubing section, a hollow plug forming a partition across the tubing section, said plug having an outlet port, a valve seat on the plug above said port, a valve head mounted for vertical movement in the tubing section and cooperating with said seat for controlling the flow of well fluid through said port and up the tubing section, thermally affected means in the tubing section, means operatively connecting the thermally affected means to the said valve head for controlling the valve head by said thermally affected means, and a housing for the thermally affected means mounted on said plug.

10. Well controlling means comprising a tubing section, a hollow plug forming a partition across the tubing section, said plug having an outlet port, a valve seat on the plug above said port, a valve head mounted for vertical movement in the tubing section and cooperating with said seat for controlling the flow of well fluid through said port and up the tubing section, thermally affected means in the tubing section, means operatively connecting the thermally affected means to the said valve head for controlling the valve head by said thermally affected means, and an imperforate housing for the thermally affected means surrounding the latter and supported by said plug.

11. A well flow control device comprising a tubing section, a partition extending across said section and having an aperture for passing well fluid from a point below the partition to a point above the partition, a valve seat in the tubing section, a valve head cooperating with the seat for controlling the flow of well fluid through the aperture from a point below the partition to a point above the partition, thermally affected means in the tubing section above the partition, means operatively connecting said thermally affected means to the valve head, and elements forming part of the last mentioned means for initially adjusting the position of the valve head relatively to said valve seat.

12. A well control device comprising a tubing section, a hollow plug secured to the tubing section and forming a partition across the interior of the latter, a port in the plug to permit well fluid to flow through the tubing section from a point below the partition to a point above the latter, an annular valve seat on the plug above said port, a tubular valve head cooperating with said seat, a thermally affected element in the tubing section above said plug, an element actuated by said thermally affected means, and means connecting said element to the valve head.

13. A well control device comprising a tubing section, a hollow plug secured to the tubing section and forming a partition across the interior of the latter, a port in the plug to permit well fluid to flow through the tubing section from a point below the partition to a point above the latter, an annular valve seat on the plug above said port, a tubular valve head cooperating with said seat, a thermally affected element in the tubing section above said plug, an element actuated by said thermally affected means, and means connecting said element to the valve head, said last mentioned means comprising means for adjustably connecting the element to the valve head, whereby the position of the latter may be initially adjusted relatively to the valve seat.

14. A well control device comprising a tubing section, a hollow plug secured to the tubing section and forming a partition across the interior of the latter, a port in the plug to permit well fluid to flow through the tubing section from a point below the partition to a point above the latter, an annular valve seat on the plug above said port, a tubular valve head cooperating with said seat, a thermally affected element in the tubing section above said plug, an element actuated by said thermally affected means, means connecting said element to the valve head, and an imperforate housing supported by the plug, surrounding the thermally affected means and forming a guide for said element.

WILBUR J. CRITES.
DONALD R. KNOWLTON.